United States Patent
Wang et al.

(10) Patent No.: US 12,102,497 B1
(45) Date of Patent: Oct. 1, 2024

(54) DENTAL IRRIGATOR WITH STEPLESS SPEED REGULATION

(71) Applicants: Shenzhen Zhihui Youpin Technology Co., LTD, Shenzhen (CN); Ruishengte Technology (Shenzhen) Co., Ltd, Shenzhen (CN)

(72) Inventors: Shuhua Wang, Shenzhen (CN); Dongbao Li, Shenzhen (CN)

( * ) Notice: Subject to any disclaimer, the term of this patent is extended or adjusted under 35 U.S.C. 154(b) by 0 days.

(21) Appl. No.: 18/424,576

(22) Filed: Jan. 26, 2024

(30) Foreign Application Priority Data

May 18, 2023 (CN) .......................... 202321213152.0

(51) Int. Cl.
  *A61C 17/024* (2006.01)
(52) U.S. Cl.
  CPC .................................. *A61C 17/024* (2019.05)
(58) Field of Classification Search
  CPC . A61C 17/02; A61C 17/0202; A61C 17/0205; A61C 17/024; A61C 17/16
  See application file for complete search history.

(56) References Cited

U.S. PATENT DOCUMENTS

| | | | | |
|---|---|---|---|---|
| 6,314,983 B1 * | 11/2001 | Hatch | ................... | E04H 4/1645 251/303 |
| 6,343,619 B1 * | 2/2002 | Pruitt | .................... | E03C 1/0412 116/277 |
| 2004/0209222 A1 * | 10/2004 | Snyder | ............... | A61C 17/0202 601/162 |
| 2014/0154640 A1 * | 6/2014 | Mok | .................... | A61C 1/0092 433/89 |
| 2015/0182319 A1 * | 7/2015 | Wagner | .................. | A61C 17/20 132/308 |
| 2021/0030518 A1 * | 2/2021 | Zhou | .................... | A61C 17/024 |
| 2023/0200958 A1 * | 6/2023 | Garrigues | .......... | A61C 17/0202 433/80 |

FOREIGN PATENT DOCUMENTS

CN   111000643 A * 4/2020

* cited by examiner

*Primary Examiner* — Justine R Yu
*Assistant Examiner* — Matthew R Moon
(74) *Attorney, Agent, or Firm* — Daniel M. Cohn; Howard M. Cohn

(57) ABSTRACT

A dental irrigator with stepless speed regulation includes a dental irrigator body; a nozzle; a stepless speed regulation component; the dental irrigator body includes a water storage chamber and a movement component embedded in the side of the water storage chamber; the movement component is used to extract water from the water storage chamber; the nozzle is arranged on the top of the movement component, and the nozzle has a water outlet pipe communicated with the movement component for teeth cleaning; the stepless speed regulation component includes an adjustment member rotatably connected to the top of the movement component, an adjustment control panel that controls the working state of the nozzle, and a transmission mechanism installed between the adjustment member and the adjustment control panel; the adjustment member drives the transmission mechanism to control the adjustment control panel to adjust the water outlet rate in the nozzle.

4 Claims, 4 Drawing Sheets

DENTAL IRRIGATOR WITH STEPLESS SPEED REGULATION

TECHNICAL FIELD

The present disclosure relates to a technical field of water pressure adjustment for dental irrigators, and in particular to a dental irrigator with stepless speed regulation.

BACKGROUND

A dental irrigator is a structure used to care for the oral cavity. The dental irrigator uses a certain pressure to eject a cleaning water column from the nozzle of the dental irrigator to clean the user's oral cavity. At present, dental irrigators are widely used in people's daily lives.

However, in the existing technology, the existing dental irrigators on the market often impact the oral teeth through continuous and high-intensity water flow during the working process, thereby ensuring the cleaning effect of the dental irrigator on the oral teeth. However, continuous high-intensity water flow not only wastes a lot of water, but is also very unfriendly to users of different ages and physical conditions. The working range of the above device is narrow, and the water pressure of the dental irrigator cannot be adjusted steplessly, making it difficult to meet the actual needs of users. Therefore, how to provide a handheld dental irrigator with stepless spped adjustment of water pressure has become an urgent technical problem to be solved.

SUMMARY

In order to solve a technical problem that insufficient flushing speed options, the present disclosure provides the dental irrigator with stepless speed regulation, comprising: a dental irrigator body; a nozzle; a stepless speed regulation component; wherein the dental irrigator body comprises a water storage chamber and a movement component embedded in the side of the water storage chamber; the movement component is used to extract water from the water storage chamber; the nozzle is arranged on the top of the movement component, and the nozzle has a water outlet pipe connected with the movement component for teeth cleaning; the stepless speed regulation component is installed above the water outlet pipe; the stepless speed regulation component comprises an adjustment member rotatably connected to the top of the movement component, an adjustment control panel that controls the working state of the nozzle, and a transmission mechanism installed between the adjustment member and the adjustment control panel; the adjustment member drives the transmission mechanism to control the adjustment control panel to adjust the water outlet rate in the nozzle.

Preferably, the movement component comprises a casing, a fixing frame and a top cover; the casing is clamped to the side of the water storage chamber; the fixing frame is provided on the top of the casing to carry the adjustment member and the transmission mechanism; the top cover penetrates the fixing frame and is fixedly inserted into the top of the casing.

Preferably, the movement component also comprises a main control panel, and the adjustment control panel is signally connected to the main control panel.

Preferably, the adjustment member comprises a main gear ring. The main gear ring is rotatably sleeved on the top of the fixing frame, and part of the main gear ring is arranged outside the casing.

Preferably, the transmission mechanism comprises a slave gear ring and a transmission shaft; the slave gear ring is arranged on the top of the fixing frame and is meshed with the main gear ring externally; one end of the transmission shaft is clamped inside the slave gear ring, and the other end is arranged on the adjustment control panel; when the main gear ring rotates, the slave gear ring is affected by the main gear ring and rotates accordingly, driving the transmission shaft to rotate.

Preferably, an indicating assembly is provided on the top of the main gear ring.

Preferably, the casing is embedded with a switch button and a gear speed button that are electrically connected to the main control panel.

Preferably, the exterior of the water storage chamber adopts a curved surface design and the inner diameter of one end of the water storage chamber close to the nozzle is smaller than the inner diameter of the other end of the water storage chamber.

The dental irrigator with stepless speed regulation provided by the present disclosure has beneficial effects as follows:

The stepless speed regulation component is installed above the water outlet pipe; the stepless speed regulation component comprises an adjustment member rotatably connected to the top of the movement component, an adjustment control panel that controls the working state of the nozzle, and a transmission mechanism installed between the adjustment member and the adjustment control panel. When the adjustment member drives the transmission mechanism to control the adjustment control panel, the stepless speed regulation component can adjust the water outlet rate in the nozzle, thereby meeting the requirements of different users for the water speed of the punching teeth, realizing multiple choices of water speed, and greatly improving the user experience.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained of the drawings without creative efforts.

Reference number in the figures:

| dental irrigator body | 1 | water storage chamber | 11 |
|---|---|---|---|
| movement component | 12 | casing | 121 |
| installation channel | 1211 | switch button | 1212 |
| gear speed button | 1213 | fixing frame | 122 |
| plug-in shafts | 1221 | top cover | 123 |
| nozzle | 2 | stepless speed regulation component | 3 |
| main gear ring | 31 | | |
| slave gear ring | 32 | rotating wheel | 311 |
| adjustment control panel | 34 | transmission shaft | 33 |
| battery module | 4 | main control panel | 35 |

DETAILED DESCRIPTION

In order to make objectives, technical solutions, and advantages of the present disclosure clearer, the present disclosure is further described in details below with reference to accompanying drawings and embodiments. It should be understood that the specific embodiments described herein are merely used to explain the present disclosure, and are not intended to limit the present disclosure.

It should be noted that when an element is referred to as being "fixed to" or "disposed on" another element, the element may be directly on the other element or the element may be indirectly fixed to or disposed on the other element by means of a third component. When an element is referred to as being "connected to" another element, the element may be directly connected to the other element or the element may be indirectly connected to the other element by means of a third component.

In addition, the terms "first" and "second" are used for descriptive purposes only and cannot be understood as indicating or implying relative importance or implicitly indicating a number of indicated technical features. Thus, features defined with "first" and "second" may explicitly or implicitly include one or more of the features. In description of the present disclosure, "a plurality of" means two or more, unless specifically defined otherwise.

Figure 1:
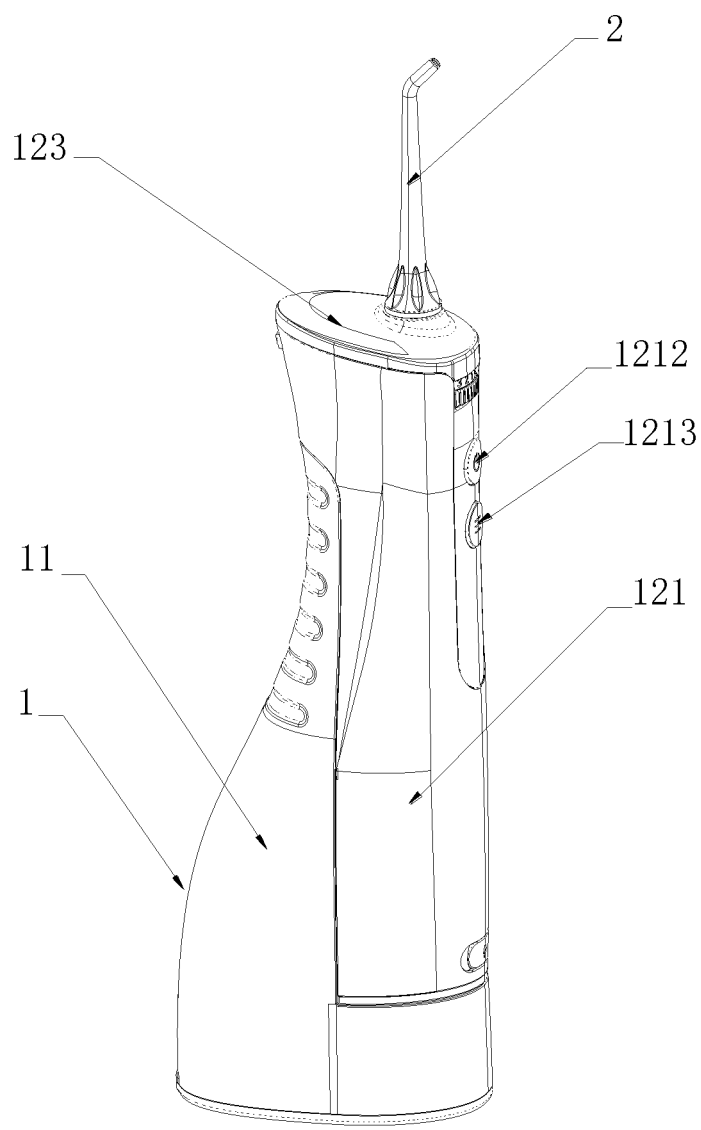
FIG. 1 is a schematic three-dimensional structural diagram of a dental irrigator with stepless speed regulation of the present disclosure.
Figure 2:
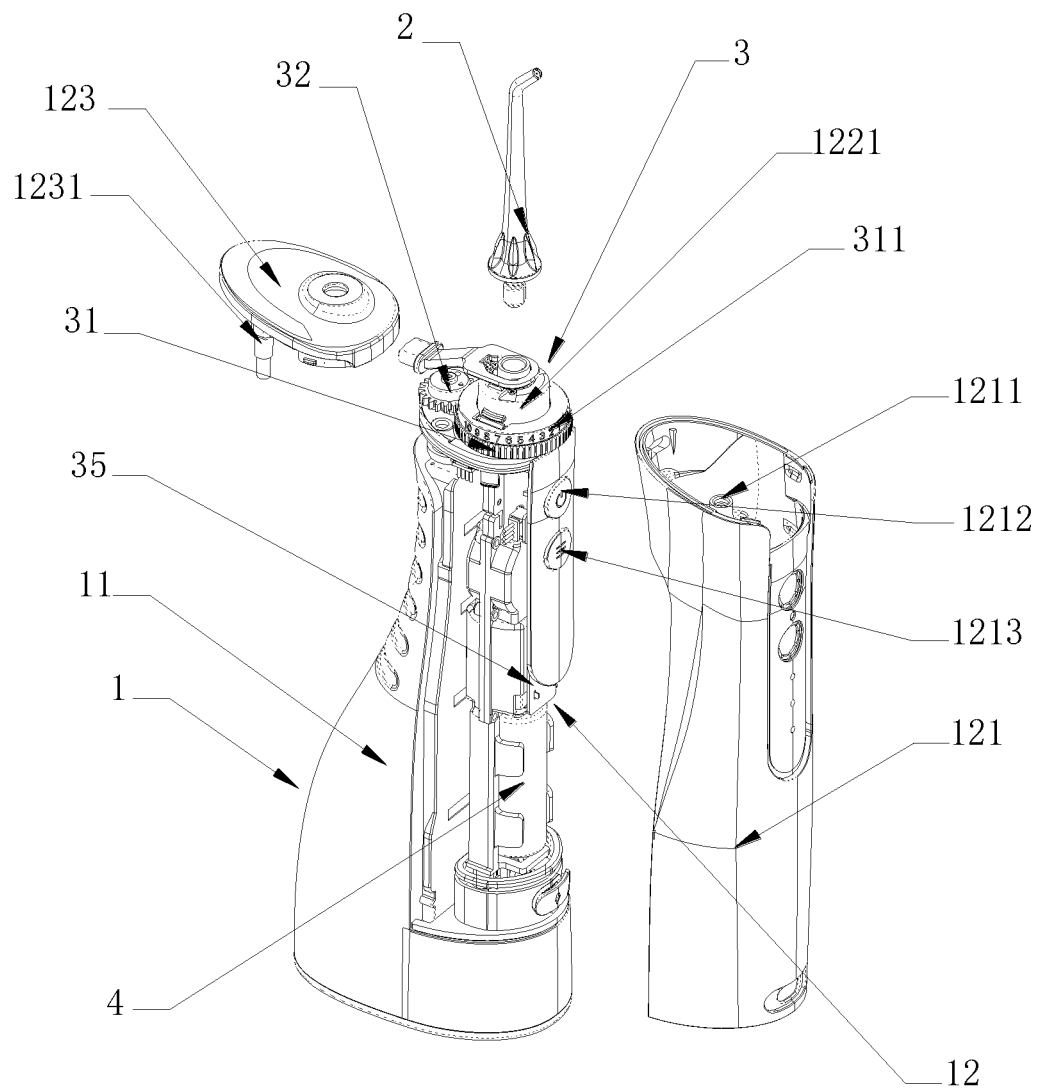
FIG. 2 is an explosion schematic diagram of the present disclosure.

The present disclosure provides a dental irrigator with stepless speed regulation, which is applied in the technical field of the dental irrigator. Referring to FIG. 1 to FIG. 4, the dental irrigator with stepless speed regulation, comprising: a dental irrigator body 1; a nozzle 2; a stepless speed regulation component 3 and other components that meet the normal operation of the structure, such as battery module 4, etc; wherein the stepless speed regulation component 3 is arranged between the dental irrigator body 1 and the nozzle 2 to adjust the water outlet rate in the nozzle 2, thereby meeting the requirements of different users for the water speed of tooth irrigator, realizing multiple choices of water speed, and greatly improve the user experience. The structures involved above are described in detail below, as follows:

In the embodiment, referring to FIG. 2, the dental irrigator body 1 comprises a water storage chamber 11 and a movement component 12 embedded in the side of the water storage chamber 11; the movement component 12 is used to extract water from the water storage chamber 11. Since the nozzle 2 is disposed on the top of the movement component 12 and has a water outlet pipe connected with the movement component 12, the water drawn out by the movement component 12 is sprayed out from the nozzle 2 for rinsing the user's teeth.

Specifically, the movement component 12 comprises a casing 121, a fixing frame 122 and a top cover 123; the casing 121 is clamped to the side of the water storage chamber 11. In the embodiment, a clamping table is provided at the side edge of the water storage chamber 11, and a clamping block adapted to the clamping table is provided at the side edge of the casing 121. After the two are engaged, the casing 121 is stably positioned on the side of the water storage chamber 11. In other embodiments, the casing 121 can also be detachably disposed on the side of the water storage chamber 11 through other structures.

Then, it should be noted that in this embodiment, the inside of the casing 121 is surrounded by a cavity, and the battery module 4, a water pump, a main control panel 35 and other structural elements that are required to pump out the water in the water storage chamber 11 are installed in the cavity. The specific principles belong to the existing technology and should be known to those in the field, and will not be elaborated here.

Figure 3:
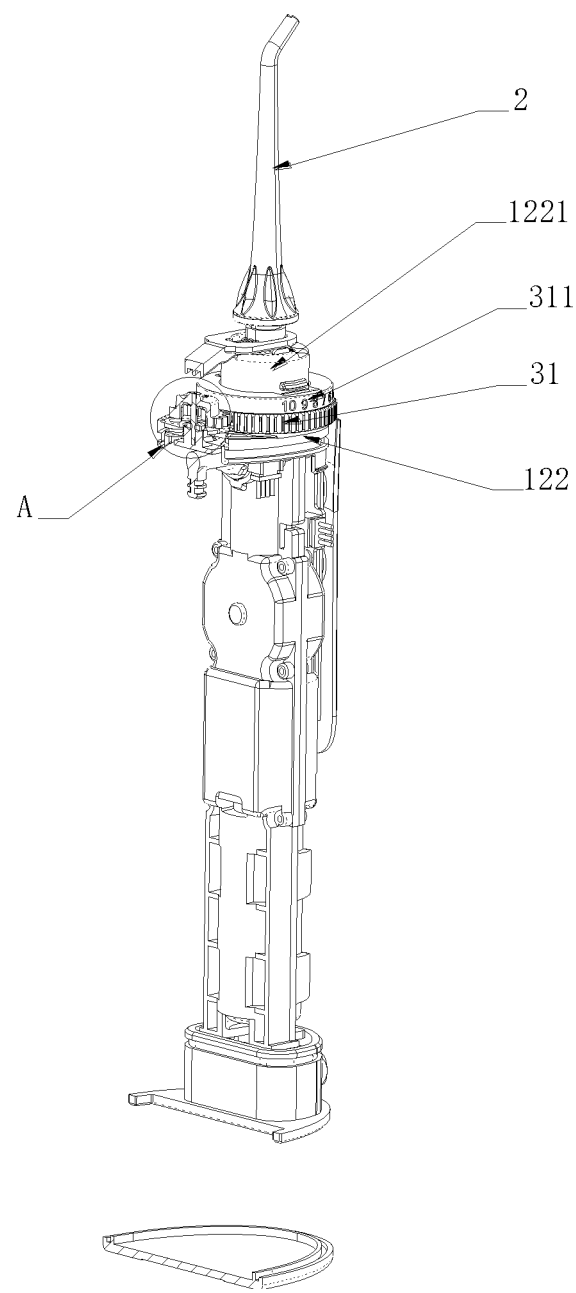
FIG. 3 is a schematic structural diagram of the present disclosure.

Furthermore, as for the fixing frame 122, it is arranged on the top of the casing 121. Referring to FIG. 2 and FIG. 3, the fixing frame 122 is mainly used to carry the adjusting parts and the transmission mechanism, and plays the role of separation and load-bearing. The bottom of the fixing frame 122 has a cover protruding along the top direction. The cover is arranged on the top of the movement component 12. On the one hand, the cover acts as a cover for the movement component 12 to protect the structure of the movement component 12, and on the other hand plays a supporting role for subsequent structures.

In the embodiment, the top cover 123 cooperates with the casing 121 to form the external protective structure of the dental irrigator. Specifically, the top cover 123 penetrates the fixing frame 122 and is fixedly connected to the top of the casing 121, thereby covering the stepless speed regulation component located on the fixing frame 122. A plurality of plug-in shafts 1221 are provided at the lower end of the top cover 123. The casing 121 is provided with an installation channel 1211 for accommodating the plug-in shafts 1221. The plug-in shafts 1221 are plugged into the installation channel 1211. Furthermore, the casing 121 and the top cover 123 are fixed, and the stability of the fixing frame 122 is also ensured, making the structural connection of the dental irrigator more stable.

Figure 4:
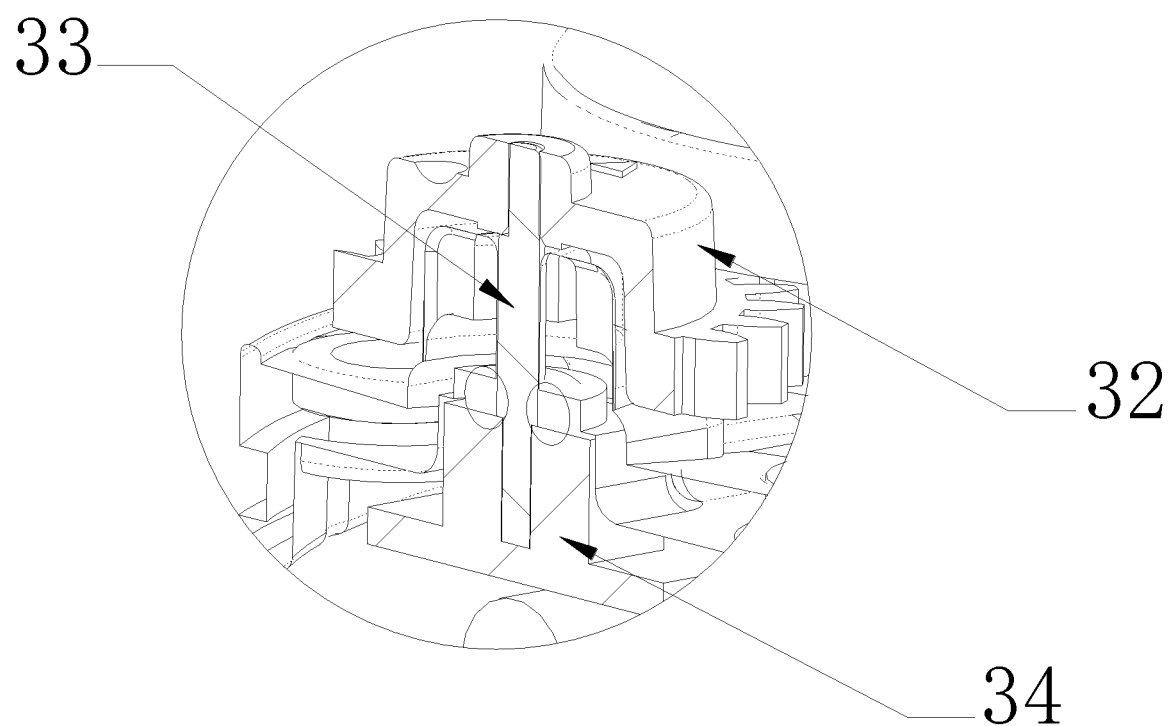
FIG. 4 is an enlargement view of portion A shown in FIG. 3.

Furthermore, referring to FIG. 2 to FIG. 4, the stepless speed regulation component 3 is installed above the water outlet pipe; the stepless speed regulation component 3 comprises an adjustment member rotatably connected to the top of the movement component 12, an adjustment control panel 34 that controls the working state of the nozzle 2, and a transmission mechanism installed between the adjustment member and the adjustment control panel 34; the adjustment member drives the transmission mechanism to control the adjustment control panel 34 to adjust the water outlet rate in the nozzle 2. Thus, the dental irrigator can meet different water speeds and adapt to various tooth washing environments.

As far as the adjustment member is concerned, the adjustment member comprises a main gear ring 31. The main gear ring 31 is rotatably sleeved on the top of the fixing frame 122. In this embodiment, the main gear ring 31 is sleeved on the outside of the cover, allowing the main gear ring 31 to rotate outside the cover. Furthermore, part of the main gear ring 31 is arranged outside the casing 121 to facilitate the operator to rotate the main gear ring 31. The transmission mechanism comprises a slave gear ring 32 and a transmission shaft 33; the slave gear ring 32 is arranged on the top of the fixing frame 122 and is meshed with the main gear ring 31 externally.

The operation of the main gear ring 31 and the slave gear ring 32 is described with reference to FIG. 2 to FIG. 4. When the main gear ring 31 rotates, the slave gear ring 32 is affected by the main gear ring 31 and rotates accordingly, driving the transmission shaft 33 to rotate. Since one end of the transmission shaft 33 is engaged with the interior of the slave gear ring 32 and the other end is disposed on the adjustment control panel 34, the slave gear ring 32 will drive the transmission shaft 33 to rotate, thereby adjusting the adjustment control panel 34. And because the movement component 12 also comprises a main control panel 35, the adjustment control panel 34 is signal-connected to the main control panel 35, so the data signal is transmitted to the main control panel 35. Therefore, the output voltage of the main control panel 35 is controlled to adjust the output power of the water pump, thereby adjusting the output water pressure to ensure that the water speed ejected by the nozzle 2 meets the user's needs.

Specifically, in other embodiments, the transmission mechanism can be other structures, as long as the adjustment control panel 34 can be adjusted to transmit signals to the main control panel 35 to meet the water pressure we need. For example, the transmission mechanism can be a positioner, etc.

To further improve user experience, referring to FIG. 3, an indicating assembly is provided on the top of the main gear ring 31. In the embodiment, a rotating wheel 311 is provided on the top of the main gear ring 31. The rotating wheel 311 is clamped in the inner ring of the main gear ring 31 and rotates together with the main gear ring 31. The indicating assembly uses Arabic numerals for indication, which are specifically divided into levels from 1 to 10. Of course, in other embodiments, other indication methods may also be used, such as English letters.

In essence, the dental irrigator also has a conventional speed adjustment function. Referring to FIG. 2, the casing 121 is embedded with a switch button 1212 and a gear speed button 1213 that are electrically connected to the main control panel 35. Pressing the gear speed button 1213, you can directly adjust to the larger or smaller water pressure gear of the nozzle 2, which is suitable for people who have insensitive teeth and save time. As for the switch button 1212, it turns on and off the dental irrigator.

Regarding the design of water storage chamber 11, in the embodiment, the exterior of the water storage chamber 11 adopts a curved surface design and the inner diameter of one end of the water storage chamber 11 close to the nozzle 2 is smaller than the inner diameter of the other end of the water storage chamber 11. The design facilitates the user to hold the dental irrigator and rinse teeth.

Regarding the operating principle of this dental irrigator: press the switch button 1212, a small amount of water will spray out from the nozzle 2 on the dental irrigator, then adjust the main gear ring 31, that is, the main gear ring 31 is rotated to a predetermined position, and then the slave gear ring 32 is affected by the movement of the main gear ring 31 and rotates accordingly, thereby driving the transmission shaft 33 to rotate. Then adjust the adjustment control panel 34 so that the main control panel 35 receives the corresponding signal and controls the output voltage. Then adjust the output power of the water pump, thereby adjusting the output water pressure, so that the speed of water ejected from the nozzle 2 meets the needs of the user, thereby washing away the dirt in the teeth. The above design can accurately adjust the water pressure and realize multiple gear selections to meet the needs of different users.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A dental irrigator with stepless speed regulation, comprising:
a dental irrigator body; a nozzle; a stepless speed regulation component;
wherein the dental irrigator body comprises a water storage chamber and a movement component embedded in the side of the water storage chamber; the movement component is used to extract water from the water storage chamber;
the nozzle is arranged on the top of the movement component, and the nozzle has a water outlet pipe connected with the movement component for teeth cleaning;
the stepless speed regulation component is installed above the water outlet pipe; the stepless speed regulation component comprises an adjustment member rotatably connected to the top of the movement component, an adjustment control panel that controls the working state of the nozzle, and a transmission mechanism installed between the adjustment member and the adjustment control panel;
the adjustment member drives the transmission mechanism to control the adjustment control panel to adjust the water outlet rate in the nozzle;
the movement component comprises a casing, a fixing frame and a top cover; the casing is clamped to the side of the water storage chamber; the fixing frame is provided on the top of the casing to carry the adjustment member and the transmission mechanism; the top cover penetrates the fixing frame and is fixedly inserted into the top of the casing;
the movement component also comprises a main control panel, and the adjustment control panel is signally connected to the main control panel;
the adjustment member comprises a main gear ring, the main gear ring is rotatably sleeved on the top of the fixing frame, and part of the main gear ring is arranged outside the casing;
the transmission mechanism comprises a slave gear ring and a transmission shaft, the slave gear ring is arranged on the top of the fixing frame and is meshed with the main gear ring externally, one end of the transmission shaft is clamped inside the slave gear ring, and the other end is arranged on the adjustment control panel; when the main gear ring rotates, the slave gear ring is affected by the main gear ring and rotates accordingly, driving the transmission shaft to rotate.

2. The dental irrigator with stepless speed regulation of claim 1, characterized in that an indicating assembly is provided on the top of the main gear ring.

3. The dental irrigator with stepless speed regulation of claim 1, characterized in that the casing is embedded with a switch button and a gear speed button that are electrically connected to the main control panel.

4. The dental irrigator with stepless speed regulation of claim 1, characterized in that the exterior of the water storage chamber adopts a curved surface design and the inner diameter of one end of the water storage chamber close to the nozzle is smaller than the inner diameter of the other end of the water storage chamber.

* * * * *